C. B. MARTIN.
MOWING-MACHINE.

No. 178,071.　　　　　　　　　Patented May 30, 1876.

WITNESSES:　　　　　　　　　　INVENTOR:
E. Wolff　　　　　　　　　　　　C. B. Martin
John Goethals　　　　　　　BY
　　　　　　　　　　　　　　　　ATTORNEYS.

UNITED STATES PATENT OFFICE.

CHARLES B. MARTIN, OF WAUPUN, WISCONSIN.

IMPROVEMENT IN MOWING-MACHINES.

Specification forming part of Letters Patent No. 178,071, dated May 30, 1876; application filed March 21, 1876.

*To all whom it may concern:*

Figure 1:
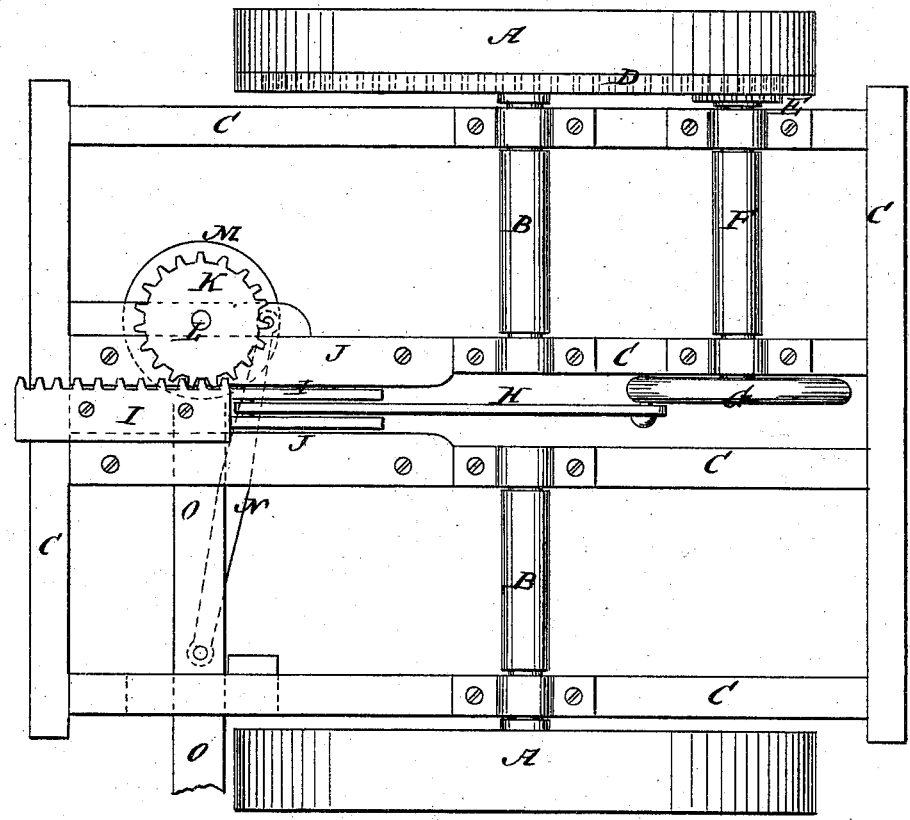
Figure 2:
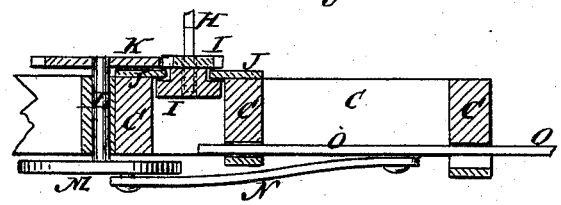

Be it known that I, CHARLES B. MARTIN, of Waupun, in the county of Dodge and State of Wisconsin, have invented new and useful Improvements in Reapers and Mowers, of which the following is a specification:

Figure 1 is a top view of the frame-work of a reaper or mower to which my improvement has been applied. Fig. 2 is a detail section of the same.

Similar letters of reference indicate corresponding parts.

The object of this invention is to improve the construction of reapers and mowers in such a way as to convert the long and unequal stroke of the connecting-bar into two short and equal strokes of the sickle, so as to vibrate the sickle with a motion of uniform velocity.

The invention consists in the combination of the sliding rack, the gear-wheel, the crank or crank-wheel, and its connecting-bar, with the sickle and with the connecting-bar, and the crank or crank-wheel driven by the drive-wheel, as hereinafter fully described.

A represents the drive-wheels, which are attached to the axle B. The axle B revolves in bearings attached to the frame C. To one of the drive-wheels A is attached, or upon it is formed, an internally-toothed gear-wheel, D, into the teeth of which mesh the teeth of a small gear-wheel. E, attached to the end of the short cross-shaft F. The shaft F revolves in bearings attached to the frame C, and to its other end is attached a crank or crank-wheel, G, to the crank-pin of which is pivoted the end of a connecting-bar, H. The other end of the connecting-bar H is pivoted to a rack, I, which slides in ways J, attached to the frame C, and the teeth of which mesh into the teeth of a gear-wheel, K, attached to the end of a short shaft, L. The shaft L revolves in bearings attached to the frame C, and to its other end is attached a crank or crank-wheel, M, to the crank-pin of which is pivoted the end of the connecting-bar N, the other end of which is pivoted to the sickle O. The cranks or crank-wheels G M are so arranged that when one of the connecting-bars H N is upon its dead-point the other may be farthest from its dead-point.

Having thus described my invention, I claim as new and desire to secure by Letters Patent—

The combination of the sliding-rack I, the gear-wheel K, the crank or crank-wheel M, and the connecting-bar N, with the sickle O, and the connecting-bar H, and crank or crank-wheel G, driven by the drive-wheel A, substantially as herein shown and described.

CHARLES B. MARTIN.

Witnesses:
E. A. HOOKER,
A. INGERSOLL, Jr.